United States Patent
Suau et al.

(10) Patent No.: US 9,896,533 B2
(45) Date of Patent: *Feb. 20, 2018

(54) NON-IONIC ASSOCIATIVE THICKENERS CONTAINING CYCLOHEXYLOL ALKYLS, FORMULATIONS CONTAINING THEM AND THEIR USES

(75) Inventors: Jean-Marc Suau, Lucenay (FR); Denis Ruhlmann, Genay (FR)

(73) Assignee: COATEX, Genay (FR)

( * ) Notice: Subject to any disclaimer, the term of this patent is extended or adjusted under 35 U.S.C. 154(b) by 336 days.

This patent is subject to a terminal disclaimer.

(21) Appl. No.: 13/495,115

(22) Filed: Jun. 13, 2012

(65) Prior Publication Data
US 2013/0158160 A1   Jun. 20, 2013

Related U.S. Application Data

(60) Provisional application No. 61/502,074, filed on Jun. 28, 2011.

(30) Foreign Application Priority Data

Jun. 14, 2011 (FR) ...................... 11 55150

(51) Int. Cl.
- C08G 18/06 (2006.01)
- C08G 18/28 (2006.01)
- C08G 18/48 (2006.01)

(52) U.S. Cl.
CPC ........... C08G 18/06 (2013.01); C08G 18/282 (2013.01); C08G 18/2825 (2013.01); C08G 18/48 (2013.01)

(58) Field of Classification Search
CPC .. C08G 18/06; C08G 18/282; C08G 18/2825; C08G 18/48
USPC .................... 524/591, 839; 528/49
See application file for complete search history.

(56) References Cited

U.S. PATENT DOCUMENTS

| | | | |
|---|---|---|---|
| 4,155,892 A * | 5/1979 | Emmons et al. | ............. 524/507 |
| 5,281,654 A | 1/1994 | Eisenhart et al. | |
| 5,376,709 A | 12/1994 | Lau et al. | |
| 5,612,408 A | 3/1997 | König et al. | |
| 5,916,967 A | 6/1999 | Jones et al. | |
| 2002/0183442 A1 | 12/2002 | Wamprecht et al. | |
| 2005/0187342 A1 | 8/2005 | Schieferstein et al. | |
| 2010/0152375 A1 | 6/2010 | Kensicher | |
| 2011/0060101 A1 | 3/2011 | Suau et al. | |
| 2012/0226075 A1 * | 9/2012 | Leutfeld et al. | ................ 564/59 |

FOREIGN PATENT DOCUMENTS

| CN | 1199754 A | 11/1998 |
|---|---|---|
| DE | 10 2006 056 509 | 6/2008 |
| EP | 1 806 386 | 7/2007 |
| EP | 2 327 732 | 6/2011 |
| FR | 2 894 980 | 6/2007 |
| RU | 2 132 344 C1 | 6/1999 |
| RU | 2 133 762 C1 | 7/1999 |
| WO | WO 99/11594 | 3/1999 |
| WO | WO 03/022947 | 3/2003 |
| WO | WO 2008/064966 | 6/2008 |
| WO | WO 2011/029556 A1 * | 3/2011 |

OTHER PUBLICATIONS

U.S. Appl. No. 13/495,080, filed Jun. 13, 2012, Suau, et al.
French Search Report dated Oct. 25, 2011, in FR 11/55150.
Office Action dated Jan. Oct. 11, 2014, in corresponding Chinese Patent Application No. 201280029298.8.
Decision on Grant dated Aug. 24, 2016, in Russian Patent Application No. 2014100900 filed Jun. 12, 2012 (English translation only).

* cited by examiner

*Primary Examiner* — Rabon Sergent

(74) *Attorney, Agent, or Firm* — Oblon, McClelland, Maier & Neustadt, L.L.P.

(57) ABSTRACT

The present invention concerns new associative thickeners of the HEUR type (Hydrophobically modified Ethylene oxide URethane) whose hydrophobic monomer is based on alkyl cyclohexylols. These are new polyurethanes that significantly thicken an aqueous formulation with a low, medium and high shear gradient. The invention also concerns the compositions containing them and their uses in different formulations such as aqueous paints.

12 Claims, No Drawings

NON-IONIC ASSOCIATIVE THICKENERS CONTAINING CYCLOHEXYLOL ALKYLS, FORMULATIONS CONTAINING THEM AND THEIR USES

REFERENCE TO PRIOR APPLICATIONS

This application claims priority to U.S. provisional application Ser. No. 61/502,074, filed Jun. 28, 2011; and to French patent application 11 55150, filed Jun. 14, 2011, both incorporated herein by reference.

The present invention concerns new associative thickeners belonging to the HEUR (Hydrophobically modified Ethylene oxide URethane) category. Used in aqueous formulations, they increase viscosity at low, medium and high shear gradient. Such a result derives in particular from the use of original groups based on alkyl cyclohexylols to manufacture the associative monomer of these thickeners.

Aqueous paint formulations containing mineral fillers consist of an aqueous phase, of one or more polymers in emulsion in the liquid phase referred to as binders, fillers and/or pigments, a dispersant and admixtures as diverse as surfactants, coalescent agents, biocides, and anti-foaming agents, and, finally, at least one thickening agent.

The latter allows a control of the rheology of aqueous formulations in which it is introduced, and in particular in aqueous paints, both at the manufacturing stage as well as during their transport, storage or in the course of their implementation. The diversity of practical constraints at the level of each of these steps reflects a multiplicity of different rheological behaviours.

One can nevertheless summarize the need of the person skilled in the art to obtain a thickening effect in the aqueous formulation, both for reasons of stability over time as well as for a possible application of paint to a vertical surface, the absence of coating splash at the time of implementation, etc. This is why the additives which contribute to this control of rheological behaviour are known as thickeners.

Among these products, there are the so-called "associative" thickeners which are water-soluble polymers with insoluble hydrophobic groups. Such macro-molecules have an associative characteristic: once introduced into water, the hydrophobic groups are susceptible to association in the form of micellar aggregates. These aggregates are linked to one another by the hydrophilic parts of the polymers: there is then the formation of a three-dimensional network that causes the increase in the viscosity of the medium.

The operating mechanism and characteristics of associative thickeners are well known today and are described for example in the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these associative thickeners, there is the class of associative thickeners of the HEUR (Hydrophobically modified Ethylene oxide URethane) type. They designate copolymers resulting from the synthesis between a compound of the polyalkylene glycol type, a polyisocyanate and a monomer or condensate called "associative" of the alkyl, aryl or aryalkyl type consisting of a hydrophobic terminal group.

These structures are well known for developing high viscosities, for an average to low shear gradient (j. of Applied Polymer Science, vol. 58, p 209-230, 1995; Polymeric Mat. Sci. and Engineering, vol. 59, p 1033, 1988; Polymeric Mat. Sci. and Engineering, vol. 61, p 533, 1989; Polymeric Paint Colour Journal, vol. 176, No. 4169, p 459, June 1986), which corresponds respectively to Stormer™ (KU) and Brookfield™ (mPa·s) measurements of viscosity.

Beyond a simple increase in viscosity for the reasons already mentioned, the paint formulator sometimes expresses the need for a more complex rheology, a true compromise between application properties and the behaviour of the product in the can. On the one hand, one can seek to increase the ICI™ viscosity of the paint formulation: this has the effect of improving the application properties of the product by limiting spatter (especially if the product is applied with a roller), sagging (if it is an application to walls or ceilings), and by an increase in the amount transferred from the application tool to the medium. On the other hand, an attempt will be made to optimize the tactile sensation of the paint when it is stirred or handled by increasing the medium shear rate viscosity, the so-called Stormer™ viscosity. Finally, an attempt is made to concurrently increase the Brookfield™ viscosity: such a phenomenon ensures a satisfactory appearance and stability of the product in the can as well as a good loading of the application tool.

To resolve this triple technical problem, the person skilled in the art today has a very broad library of structures that differ essentially in the choice of the hydrophobic monomer.

Document EP 1 566 393 describes a HEUR type thickener, one of the essential characteristic of which is the presence of n-butyl-1-octanol, while its hydrophobic groups are based on fatty alcohols with 8 to 18 carbon atoms. Document DE 10 206 023001 describes an associative non-ionic thickening agent of the HEUR type including a branched linear alcohol. Document EP 1 241 198 describes polyurethane-based thickening agents including a monoalcohol having 6 to 22 carbon atoms. Document EP 1 013 264 describes a polyurethane thickener for cosmetic formulations with an associative monomer functionalized by a hydrophobic group that can be linear or branched, but preferentially linear and possessing 12 to 24 carbon atoms. Document WO 94/06840 proposes an associative thickener of the HEUR type characterized by a certain density of hydrophobic pendant groups by a urethane linkage, the said groups being linear alkyl chains with 8 to 22 carbon atoms. Document EP 1 584 331 proposes a hydrophobic terminal group with 6 to 34 carbon atoms for the associative monomer. To specifically increase the Brookfield™ viscosity, document EP 0 639 595 proposes linear hydrophobic groups having 4 to 36 carbon atoms. Document WO 02/102868 also makes reference to linear structures for the associative monomer.

However, none of the structures of the HEUR type of the prior art, classically based on associative monomers with linear alkyl groups, allow the simultaneous and sufficient increase in the ICI™, Stormer™ and Brookfield™ viscosities of the paint formulations in which they are used. Continuing her research in this regard, the Applicant found quite surprisingly that the use of certain structures instead of the hydrophobic monomer resulted in an increase of these 3 viscosities for a number of carbon atoms that was identical or close to the linear alkyl structures of the prior art.

This technological advance is based on the use, as a hydrophobic monomer, of a compound whose structure corresponds to formula (I):

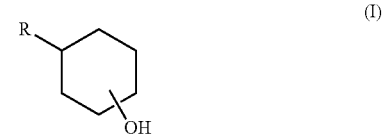

where R designates an alkyl group with 6 to 10 carbon atoms. Such compounds have been identified as surfactants and are obtained by hydrogenation of an alkyl phenol. In particular, reference can be made to document U.S. Pat. No. 6,111,146 which describes their synthesis. The resulting compounds are referred by the expression "alkyl cyclohexylols". It is important to add that the final structure is not that of an alkyl phenol, and that the resulting product will not be categorized as such.

These structures are therefore used to manufacture water-soluble polyurethanes resulting from the condensation:
a) of at least one monomer with the formula (I)

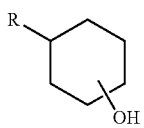

(I)

where R designates an alkyl group with 6 to 10 carbon atoms, preferentially 9 carbon atoms,
b) of at least one polyalkylene glycol, and
c) of at least one polyisocyanate.

It is these new polyurethanes that, for example, allow a thickening of a low, medium and high shear gradient paint formulation, this increase being measured against the values obtained with linear alkyl structures of the prior art with a very similar number of carbon atoms.

Also, a first object of the present invention consists of water-soluble polyurethanes resulting from the condensation:
a) of at least one monomer with the formula (I)

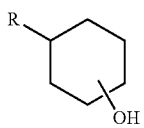

(I)

where R designates an alkyl group with 6 to 10 carbon atoms, preferentially 9 carbon atoms,
b) of at least one polyalkylene glycol,
c) and, of at least one polyisocyanate.

Polyurethane" is understood to mean a urethane polymer, i.e. a compound produced by the reaction between an isocyanate and an alcohol.

According to the invention, the term "alkyl" designates a linear or branched hydrocarbon radical with 6 to 10 carbon atoms, such as hexyl, heptyl, octyl, nonyl, decyl.

"Polyalkylene glycol" is understood to mean a polymer of an alkylene glycol derived from an olefinic oxide. The polyalkylene glycol according to the present invention is, for example, polyethylene glycol, polypropylene glycol, polybutylene glycol or a polyalkylene glycol containing a proportion of an ethylene-oxy group and/or a proportion of a propylene-oxy group and/or a proportion of a butylene-oxy group. The polyalkylene glycol according to the present invention can, for example, include a dominant proportion of an ethylene-oxy group in association with a secondary proportion of a propylene-oxy group. Specific examples of alkylene glycol polymers include: polyalkylene glycols having an average molecular weight of 1,000, 4,000, 6,000, 10,000 and 20,000 g/mol (in the case of polyethylene glycol called PEG-1000, PEG-4000, PEG-6000, PEG 10000 and PEG 20000); polyethylene polypropylene glycols having a percentage of ethylene oxide of between 20 and 80% by weight and a percentage of propylene oxide of between 20 and 80% by weight.

"Polyisocyanate" is understood to mean a compound which includes at least 2 functional isocyanate groups —N═C═O.

According to one aspect of the present invention, the monomer of formula (I) has the following formula (II):

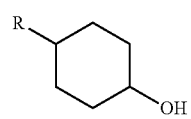

(II)

where R designates an alkyl group as defined above, i.e. having 6 to 10 carbon atoms.

According to another aspect of the present invention, monomer a) has a formula (I) or (II) where R designates a group having 9 carbon atoms.

The Applicant states that the manufacture of these polyurethanes, which belong to the HEUR type family of thickeners, is perfectly known to the person skilled in the art who can refer to the instructions of the documents cited previously in the technological background to the present invention.

According to one aspect of the present invention, the polyurethanes resulting from the condensation of:
a) 1% to 29% by weight of at least one monomer with the formula (I) or (II), and preferably 3% to 7% by weight,
b) 70% to 98% by weight of at least one polyalkylene glycol, and preferably 86% to 94% by weight, and
c) 1% to 29% by weight of at least one polyisocyanate, and preferably 3% to 7% by weight,
where the sum of these mass percentages is equal to 100%.

According to another aspect of the present invention, the polyurethanes result from the condensation of two monofunctional alcohols, a polyalkylene glycol and a polyisocyanate. In this case, one of two monofunctional alcohols has a formula (I) or (II) where R designates an alkyl group having 6 to 10 carbon atoms, and preferably 9 carbon atoms, and the other monofunctional alcohol is of the aliphatic alcohol type, whether linear or branched, having between 6 et 20 carbon atoms, and preferably between 10 and 15 carbon atoms.

According to yet another aspect of the present invention, the polyurethanes result from the condensation of:
a) 1 to 29% by weight of a monomer of formula (I):

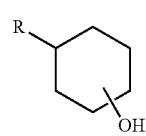

(I)

where R designates an alkyl group having between 6 and 10 carbon atoms, and preferably between 9 carbon atoms,
b) 70% to 98% by weight of a polyalkylene glycol,
c) 1% to 29% by weight of a polyisocyanate, and d) 1 to 29% by weight of an aliphatic alcohol having between 6 and 20 carbon atoms, and preferably between 10 and 15 carbon atoms, where the sum of these mass percentages is equal to 100%.

According to one aspect of the present invention, the polyurethanes result from the condensation notably of a polyalkylene glycol which is polyethylene glycol. This may relate, for example, to a polyethylene glycol the molecular mass of which varies between 2,000 g/mol and 20,000 g/mol, for example between 8,000 g/mol and 15,000 g/mol. As an example, polyethylene glycol of molecular mass 10,000 g/mol and 12,000 g/mol may be cited.

According to another aspect of the present invention, the polyurethanes result from the condensation notably of a polyisocyanate which is chosen from the group consisting of toluene diisocyanate, the toluene diisocyanate dimers and the toluene diisocyanate trimers, 1,4-butane diisocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane, a blend of 1-methyl-2,4-diisocyanatocyclohexane and 1-methyl-2,6-diisocyanatocyclohexane, the biuret of hexamethylene diisocyanate, the dimers of biuret of hexamethylene diisocyanate, the trimers of biuret of hexamethylene diisocyanate and a blend of at least two of these compounds.

A second object of the present invention relates to a method of preparing a polyurethane according to the invention, where the said method consists of a condensation of the various constituents of the polyurethane.

A third object of the present invention consists of an aqueous composition including a polyurethane according to the present invention.

According to one aspect of the invention, the said aqueous composition also includes water and at least one non-ionic surfactant. Thus, according to this aspect of the invention, the polyurethane is formulated in water in the presence of at least one non-ionic surfactant agent.

A "non-ionic surfactant" or "non-ionic surfactant agent" is understood to mean a non-ionic molecule consisting of at least a hydrophilic part and of at least a hydrophobic part.

According to one embodiment of the present invention, the said composition includes several surfactant agents, for example two, three or four.

According to another aspect of the present invention, the said aqueous composition also includes at least one additive selected from the group consisting of a biocide, a solvent, an anti-foaming agent, a pH regulator, a coalescent agent and their blends.

A "biocide" is understood to mean a chemical substance intended to destroy, repel or make harmless harmful organisms, to prevent their action, or to oppose them in any other manner, through a chemical or biological action.

An "anti-foaming agent" is understood to mean a substance or a formulation intended to destroy air bubbles within a homogenous or heterogeneous liquid medium (or at its surface), or to prevent their formation.

A "pH regulator" or "pH regulating agent" is understood to mean a chemical compound which enables the pH to be adjusted to the expected value. For example, the pH regulating agent can increase the pH; this is the case with bases, such as NaOH. Alternatively, the pH regulating agent can reduce the pH; this is the case with acids.

A "coalescent agent" is understood to mean an agent used in paints which enables the Minimum Film Formation Temperature (MFFT) of paint to be reduced to a temperature suitable for the desired conditions of application (for example a TMFF of 5° C. for outside application). As an example of a coalescent agent according to the invention, propylene glycol, butyl glycol, 2,2,4-trimethyl-1,3-pentanediol monoisobutyrate or 2,2,4-trimethyl-1,3-pentanediol diisobutyrate may be cited.

According to yet another aspect, the aqueous composition of the present invention consists of:
1) 5% to 45% by weight of at least one polyurethane according to the invention, and preferably between 10 and 30% by weight,
2) 5% to 30% by weight of at least one surfactant, and preferably between 7 and 20% by weight,
3) 25% to 75% by weight of water, and
4) 0 to 5% by weight of at least one other additive chosen from the group consisting of a biocide, a solvent, an anti-foaming agent, a pH regulator, a coalescent agent, and their blends, where the sum of these mass percentages is equal to 100%.

According to yet another aspect, the aqueous composition of the present invention consists of a polyurethane as described above, a surfactant, water, a biocide and an anti-foaming agent.

According to another aspect of the invention, the aqueous composition consists of a blend of 5 to 45% by weight of at least one polyurethane as described above, 5 to 30% by weight of at least one surfactant, 25 to 75% by weight of water, 0.01 to 5% by weight of at least one biocide and 0.01 to 5% by weight of at least one anti-foaming agent.

A fourth object of the present invention relates to a method of preparation of an aqueous composition according to the invention, where the said method consists of blending different constituents of the aqueous composition.

A fifth object of the present invention consists of the use of a polyurethane according to the invention or an aqueous composition according to the invention to thicken an aqueous formulation, where the said formulation is selected from the group consisting of a paint, a lacquer, a varnish, a paper coating, a cosmetic formulation and a detergent formulation.

A sixth object of the present invention relates to an aqueous formulation including a polyurethane according to the invention or an aqueous composition according to the invention, where the said formulation is selected from the group consisting of a paint, a lacquer, a varnish, a paper coating, a cosmetic formulation and a detergent formulation. According to one aspect of this object of the invention, the aqueous formulation is a paint and includes at least one dispersing agent, at least one mineral filler, at least one binder, at least one biocide, at least one anti-foaming agent, and possibly a coalescent agent.

A final object of the present invention relates to a method of preparation of an aqueous formulation according to the invention, where the said method consists of blending different constituents of the aqueous formulation.

The following examples allow a better understanding of the invention without however limiting its scope.

EXAMPLES

Example 1

This example describes a polyurethane according to the invention that uses a compound of formula (I) where R designates the linear alkyl group with 9 carbon atoms. Thus, we have here a hydrophobic monomer with the formula (I) with 15 carbon atoms.

At the same time, this example also illustrates 4 polyurethanes according to the prior art that use linear fatty alcohols with 12, 14, 16 and 18 carbon atoms.

This example describes a polyurethane apart from the invention that uses a compound of formula (I) where R designates the linear alkyl group with 12 carbon atoms. Thus, we have here a hydrophobic monomer with the formula (I) with 18 carbon atoms.

All the polyurethanes are products that are the result of the condensation, expressed in % by weight of each of the constituents, of 90% polyethylene glycol with a molecular mass by weight equal to 10,000 g/mol, of 5% of a monomer terminated by a hydrophobic group, the nature of which will be specified later, and of 5% of isophorone diisocyanate.

Finally, all these polyurethanes are formulated in water in the presence of a non-ionic surfactant (in this instance, a blend of commercially available branched alcoxylated C8 and C10 compounds) (ratio by weight: 30% polyurethane, 20% surfactant, 50% water).

An aqueous composition is obtained in this manner.

Test No. 1

This test illustrates a domain outside of the invention and corresponds to a formulation in water at 30% by dry weight of a polyurethane with a molecular mass by weight equal to approximately 11,000 g/mol where the hydrophobic monomer has the formula (I), where R designates the linear alkyl group with 12 carbon atoms.

Test No. 2

This test illustrates the invention and corresponds to a formulation in water at 30% by dry weight of a polyurethane with a molecular mass by weight equal to approximately 11,000 g/mol where the hydrophobic monomer has the formula (I), where R designates the linear alkyl group with 9 carbon atoms.

Test No. 3

This test illustrates the prior art and corresponds to a formulation in water at 30% by dry weight of a polyurethane with a molecular mass by weight equal to approximately 11,000 g/mol where the hydrophobic monomer is a linear alcohol with 12 carbon atoms marketed under the name Nacol™ 12-96 by the SASOL™ company.

Test No. 4

This test illustrates the prior art and corresponds to a formulation in water at 30% by dry weight of a polyurethane with a molecular mass by weight equal to approximately 11,000 g/mol where the hydrophobic monomer is a linear alcohol with 14 carbon atoms marketed under the name Nacol™ 14-98 by the SASOL™ company.

Test No. 5

This test illustrates the prior art and corresponds to a formulation in water at 30% by dry weight of a polyurethane with a molecular mass by weight equal to approximately 11,000 g/mol where the hydrophobic monomer is a linear alcohol with 16 carbon atoms marketed under the name Nacol™ 16-95 by the SASOL™ company.

Test No. 6

This test illustrates the prior art and corresponds to a formulation in water at 30% by dry weight of a polyurethane with a molecular mass by weight equal to approximately 11,000 g/mol where the hydrophobic monomer is a linear alcohol with 18 carbon atoms marketed under the name Nacol™ 18-98 by the SASOL™ company.

Test No. 7

This test illustrates the prior art and uses Acrysol™ RM 8 W marketed by the DOW™ company.

Example 2

This example illustrates the use of polyurethanes of example 1 as thickening agents for a flat paint.

The composition of the said paint is indicated in table 1, the mass of each constituent being indicated in grams.

The paint is formulated according to methods well known to the person skilled in the art.

In each test, 0.2% by dry weight of the polymer according to the invention is used in relation to the total weight of the paint formulation, i.e. approximately for 1 kg of formulation as defined below, 6.67 g of an aqueous composition as mentioned above.

TABLE 1

| Constituents | Mass (g) |
| --- | --- |
| Water | 190 |
| Ecodis ™ P50 (Coatex ™) | 4 |
| Acticide MBS (Thor ™) | 2 |
| Tego ™ 810 (Tego ™) | 1 |
| NaOH (20%) | 1 |
| Tiona ™ 568 (Millenium ™) | 80 |
| Durcal ™ 2 (Omya ™) | 300 |
| Omyacoat ™ 850 OG (Omya ™) | 220 |
| Acronal ™ 290 D (BASF ™) | 130 |
| Monopropylene glycol | 10 |
| Texanol ™ (Eastman ™) | 10 |
| Water | QS 1,000 |

The resulting viscosities are then determined at T=24 hours at 25° C., at low shear rate, Brookfield™ viscosity at 10 RPM, designated $\mu_{Bk10}$ (mPa·s), at medium shear rate, Stormer viscosity, designated $\mu_S$ (KU), and at high shear rate, ICI viscosity, designated $\mu_{ICI}$ (Poise or P).

The results are shown in table 2.

TABLE 2

| Test No. | 1 | 2 | 3 | 4 | 5 | 6 | 7 |
| --- | --- | --- | --- | --- | --- | --- | --- |
| PA/IN associative monomer | OI C18 | IN C15 | PA C12 | PA C14 | PA C16 | PA C18 | PA Acrysol RM8W |
| $\mu_{ICI}$ (P) | 0.95 | 1.2 | 1.2 | 0.95 | 0.95 | 0.85 | 1.0 |
| $\mu_S$ (KU) | 128 | 102 | 96 | 106 | 125 | 116 | 103 |
| $\mu_{Bk10}$ (mPa · s) | 18,000 | 3,800 | 3,160 | 12,000 | 20,300 | 23,900 | 3,800 |

If the results obtained with the linear structures of the prior art are analysed, it will be apparent that the associativity of polymers disappears or decreases very significantly for more than 12 carbon atoms. At the same time, the Brookfield™ viscosity increases very significantly for 14 carbon atoms and more.

The polymers of the prior art of which the hydrophobic monomer is a linear C14, C16 or C18 are therefore not efficient enough in terms of ICI™ viscosity. As to the C12 polymer, it does not develop a sufficient Brookfield™ and Stormer™ viscosity.

However, surprisingly, the polymer according to the invention develops a totally unique rheology: it enables an equaling of the ICI™ viscosity obtained with the C12 polymer while exceeding its Brookfield™ and Stormer™ viscosity levels.

It can even improve the performances obtained with the commercial polymer according to test No. 7, which produces a significant deficit in ICI™ viscosity.

Finally, test No. 1 demonstrates the importance of limiting the number of carbons in the hydrophobic monomer according to the invention. With 18 carbon atoms, the polymer in test No. 1 is not effective enough at a high shear gradient (ICI™ viscosity).

Example 3

This example illustrates the use of the polyurethanes of example 1 as thickening agents for another flat paint.

The composition of the said paint is indicated in table 3, the mass of each constituent being indicated in grams.

The paint is formulated according to methods well known to the person skilled in the art.

In each test, 0.36% by dry weight of the polymer according to the invention is used in relation to the total weight of the paint formulation.

TABLE 3

| Constituents | Mass (g) |
|---|---|
| Water | 277 |
| Ecodis ™ P50 (Coatex ™) | 4 |
| Acticide MBS (Thor ™) | 2 |
| Tego ™ Airex 901 W (Tego ™) | 1 |
| NaOH (20%) | 0.9 |
| Tiona ™ 568 (Millenium ™) | 81 |
| Durcal ™ 2 (Omya ™) | 300.1 |
| Omyacoat ™ 850 OG (Omya ™) | 133 |
| Mowilith LDM 1871 ™ (Celanese ™) | 150 |
| Tego ™ 825 (Tego ™) | 10 |
| Water | QS 1,000 |

The resulting viscosities are then determined at T=24 hours at 25° C., at low shear rate, Brookfield™ viscosity at 10 RPM, designated $\mu_{Bk10}$ (mPa·s), at medium shear rate, Stormer viscosity, designated $\mu_S$ (KU), and at high shear rate, ICI viscosity, designated $\mu_{ICI}$ (Poise or P).

The results are shown in table 4.

TABLE 4

| Test No. | 1 | 2 | 3 | 4 | 5 | 6 | 7 |
|---|---|---|---|---|---|---|---|
| PA/IN associative monomer | OI C18 | IN C15 | PA C12 linear | PA C14 linear | PA C16 linear | PA C18 linear | PA Acrysol RM8W |
| $\mu_{ICI}$ (P) | 0.7 | 1.1 | 1.1 | 0.75 | 0.65 | 0.6 | 0.75 |
| $\mu_S$ (KU) | 137 | 104 | 100 | 110 | 135 | 121 | 93 |
| $\mu_{Bk10}$ (mPa · s) | 25,000 | 10,200 | 8,800 | 20,000 | 36,000 | 45,000 | 9,700 |

The same conclusions are drawn from this table as those of the previous example.

The invention claimed is:

1. A water soluble polyurethane consisting of polymerized units resulting from the condensation of:
   a monomer of formula (I)

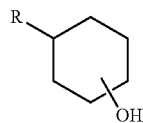

(I)

where R designates an alkyl group with 9 carbon atoms, a polyalkylene glycol, and a polyisocyanate.

2. The polyurethane according to claim 1, consisting of polymerized units resulting from the condensation of:
   a) 1% to 29% by weight of said monomer of formula (I),
   b) 70% to 98% by weight of said polyalkylene glycol, and
   c) 1% to 29% by weight of said polyisocyanate
   where the sum of these mass percentages is equal to 100%.

3. The polyurethane according to claim 1, consisting of polymerized units resulting from the condensation of
   a) 3% to 7% by weight of said monomer of formula (I),
   b) 86% to 94% by weight of said polyalkylene glycol, and
   c) 3% to 7% by weight of said polyisocyanate
   where the sum of these mass percentages is equal to 100%.

4. The polyurethane according to claim 1, where the polyalkylene glycol is polyethylene glycol the molecular mass by weight of which is 2,000 g/mol-20,000 g/mol.

5. The polyurethane according to claim 1, where the polyisocyanate is chosen from the group consisting of toluene diisocyanate, the toluene diisocyanate dimers, the toluene diisocyanate trimers, 1,4-butane diisocyanate, 1,6-hexane diisocyanate, isophorone diisocyanate, 1,3-cyclohexane diisocyanate, 1,4-cyclohexane diisocyanate, 4,4'-diisocyanatodicyclohexylmethane, 1-methyl-2,4-diisocyanatocyclohexane, a blend of 1-methyl-2,4-diisocyanatocyclohexane and 1-methyl-2,6-diisocyanatocyclohexane, the biuret of hexamethylene diisocyanate, the dimers of the biuret of hexamethylene diisocyanate, the trimers of biuret of hexamethylene diisocyanate, and mixtures thereof.

6. An aqueous composition comprising water and a polyurethane according to claim 1.

7. An aqueous composition according to claim 6, further comprising a surfactant.

8. An aqueous composition according to claim 6, further comprising an additive selected from the group consisting of a biocide, a solvent, an anti-foaming agent, a pH regulator, a coalescent agent and mixtures thereof.

9. An aqueous composition according to claim 6, comprising:
   5% to 45% by weight of said polyurethane,
   5% to 30% by weight of a surfactant,
   25% to 75% by weight of water, and
   0 to 5% by weight of an additive selected from the group consisting of a biocide, a solvent, an anti-foaming agent, a pH regulator, a coalescent agent, and mixtures thereof,
   where the sum of these mass percentages is equal to 100%.

10. The polyurethane according to claim 1, wherein the monomer of formula (I) is a compound of the following formula (II):

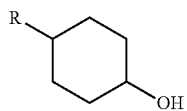

where R designates an alkyl group having 9 carbon atoms.

11. An aqueous composition according to claim 6, wherein the monomer of formula (I) is a compound of the following formula (II):

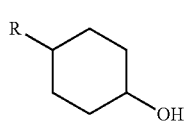

where R designates an alkyl group having 9 carbon atoms.

12. The polyurethane according to claim 1, consisting of polymerized units resulting from the condensation of a) 3% to 7% by weight of said monomer of formula (I),
b) 86% to 94% by weight of said polyalkylene glycol, and
c) 3% to 7% by weight of said polyisocyanate where the sum of these mass percentages is equal to 100%, the polyalkylene glycol is polyethylene glycol the molecular mass by weight of which is 2,000 g/mol-20,000 g/mol, and the polyisocyanate is chosen from the group consisting of toluene diisocyanate, the toluene diisocyanate dimers, the toluene diisocyanate trimers, 1,4-butane diisocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane, a blend of 1-methyl-2,4-diisocyanatocyclohexane and 1-methyl-2,6-diisocyanatocyclohexane, the biuret of hexamethylene diisocyanate, the dimers of the biuret of hexamethylene diisocyanate, the trimers of biuret of hexamethylene diisocyanate, and mixtures thereof.

* * * * *